(12) United States Patent
Garg et al.

(10) Patent No.: US 6,584,121 B1
(45) Date of Patent: Jun. 24, 2003

(54) SWITCH ARCHITECTURE FOR DIGITAL MULTIPLEXED SIGNALS

(75) Inventors: Brij Bhushan Garg, Salem, NH (US); Donald James Wemple, Plymouth, VT (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/191,640

(22) Filed: Nov. 13, 1998

(51) Int. Cl.[7] .................................................. H04J 3/24
(52) U.S. Cl. ........................................ 370/474; 370/369
(58) Field of Search ................................. 370/352, 353, 370/354, 355, 356, 359, 369, 395, 474, 476, 394, 535, 389, 536, 471, 408, 477, 396, 357–358, 370–372, 391

(56) References Cited

U.S. PATENT DOCUMENTS

| | | | | |
|---|---|---|---|---|
| 4,893,306 A | * | 1/1990 | Chao et al. ................. | 370/395 |
| 5,303,232 A | * | 4/1994 | Proctor et al. .............. | 370/398 |
| 5,327,421 A | * | 7/1994 | Hiller et al. ................ | 370/395 |
| 5,537,403 A | * | 7/1996 | Cloonan et al. ............. | 370/352 |
| 5,625,625 A | * | 4/1997 | Oskouy et al. .............. | 370/395 |
| 6,134,246 A | * | 10/2000 | Cai et al. .................... | 370/395 |
| 6,205,145 B1 | * | 3/2001 | Yamazaki .................... | 370/395 |
| 6,208,654 B1 | * | 3/2001 | Moteki et al. ............... | 370/395 |

* cited by examiner

Primary Examiner—Dang Ton
Assistant Examiner—Phuc Tran
(74) Attorney, Agent, or Firm—Moser, Patterson & Sheridan, L.L.P.

(57) ABSTRACT

In a switch in accordance with the principles of the present invention, switch modules that include a disassembly block, a switching core, and an assembly block are combined to implement an N×M multi-port switch that effectively connects N input ports to M output ports, provides broadcast capability, and may be non-blocking. The switch operates on data channels that all have their respective data blocks organized in the same number of bit-packs. Disassemblers within each module slice incoming data blocks into bit-packs and route the bit-packs to switching cores. A switching core within each module connects each input channel with each output channel at the bit-pack level. Assemblers within each module receive the switched bit-packs from each switching core and assemble the bit-packs into data blocks for each of the output channels.

21 Claims, 14 Drawing Sheets

FIG. 6

| RAIL | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 1 | 4 | 7 | 10 | 13 | 16 | 19 | 22 | 2 | 5 | 8 | 11 | 14 | 17 | 20 | 23 | 3 | 6 | 9 | 12 | 15 | 18 | 21 | 24 |
| 2 | 25 | 28 | 31 | 34 | 37 | 40 | 43 | 46 | 26 | 29 | 32 | 35 | 38 | 41 | 44 | 47 | 27 | 30 | 33 | 36 | 39 | 42 | 45 | 48 |
| 3 | 49 | 52 | 55 | 58 | 61 | 64 | 67 | 70 | 50 | 53 | 56 | 59 | 62 | 65 | 68 | 71 | 51 | 54 | 57 | 60 | 63 | 66 | 69 | 72 |
| 4 | 73 | 76 | 79 | 82 | 85 | 88 | 91 | 94 | 74 | 77 | 80 | 83 | 86 | 89 | 92 | 95 | 75 | 78 | 81 | 84 | 87 | 90 | 93 | 96 |
| 5 | 97 | 100 | 103 | 106 | 109 | 112 | 115 | 118 | 98 | 101 | 104 | 107 | 110 | 113 | 116 | 119 | 99 | 102 | 105 | 108 | 111 | 114 | 117 | 120 |
| 6 | 121 | 124 | 127 | 130 | 133 | 136 | 139 | 142 | 122 | 125 | 128 | 131 | 134 | 137 | 140 | 143 | 123 | 126 | 129 | 132 | 135 | 138 | 141 | 144 |
| 7 | 145 | 148 | 151 | 154 | 157 | 160 | 163 | 166 | 146 | 149 | 152 | 155 | 158 | 161 | 164 | 167 | 147 | 150 | 153 | 156 | 159 | 162 | 165 | 168 |
| 8 | 169 | 172 | 175 | 178 | 181 | 184 | 187 | 190 | 170 | 173 | 176 | 179 | 182 | 185 | 188 | 191 | 171 | 174 | 177 | 180 | 183 | 186 | 189 | 192 |
| 9 | 193 | 196 | 199 | 202 | 205 | 208 | 211 | 214 | 194 | 197 | 200 | 203 | 206 | 209 | 212 | 215 | 195 | 198 | 201 | 204 | 207 | 210 | 213 | 216 |
| 10 | 217 | 220 | 223 | 226 | 229 | 232 | 235 | 238 | 218 | 221 | 224 | 227 | 230 | 233 | 236 | 239 | 219 | 222 | 225 | 228 | 231 | 234 | 237 | 240 |
| 11 | 241 | 244 | 247 | 250 | 253 | 256 | 259 | 262 | 242 | 245 | 248 | 251 | 254 | 257 | 260 | 263 | 243 | 246 | 249 | 252 | 255 | 258 | 261 | 264 |
| 12 | 265 | 268 | 271 | 274 | 277 | 280 | 283 | 286 | 266 | 269 | 272 | 275 | 278 | 281 | 284 | 287 | 267 | 270 | 273 | 276 | 279 | 282 | 285 | 288 |
| 13 | 289 | 292 | 295 | 298 | 301 | 304 | 307 | 310 | 290 | 293 | 296 | 299 | 302 | 305 | 308 | 311 | 291 | 294 | 297 | 300 | 303 | 306 | 309 | 312 |
| 14 | 313 | 316 | 319 | 322 | 325 | 328 | 331 | 334 | 314 | 317 | 320 | 323 | 326 | 329 | 332 | 335 | 315 | 318 | 321 | 324 | 327 | 330 | 333 | 336 |
| 15 | 337 | 340 | 343 | 346 | 349 | 352 | 355 | 358 | 338 | 341 | 344 | 347 | 350 | 353 | 356 | 359 | 339 | 342 | 345 | 348 | 351 | 354 | 357 | 360 |
| 16 | 361 | 364 | 367 | 370 | 373 | 376 | 379 | 382 | 362 | 365 | 368 | 371 | 374 | 377 | 380 | 383 | 363 | 366 | 369 | 372 | 375 | 378 | 381 | 384 |
| 17 | 385 | 388 | 391 | 394 | 397 | 400 | 403 | 406 | 386 | 389 | 392 | 395 | 398 | 401 | 404 | 407 | 387 | 390 | 393 | 396 | 399 | 402 | 405 | 408 |
| 18 | 409 | 412 | 415 | 418 | 421 | 424 | 427 | 430 | 410 | 413 | 416 | 419 | 422 | 425 | 428 | 431 | 411 | 414 | 417 | 420 | 423 | 426 | 429 | 432 |
| 19 | 433 | 436 | 439 | 442 | 445 | 448 | 451 | 454 | 434 | 437 | 440 | 443 | 446 | 449 | 452 | 455 | 435 | 438 | 441 | 444 | 447 | 450 | 453 | 456 |
| 20 | 457 | 460 | 463 | 466 | 469 | 472 | 475 | 478 | 458 | 461 | 464 | 467 | 470 | 473 | 476 | 479 | 459 | 462 | 465 | 468 | 471 | 474 | 477 | 480 |
| 21 | 481 | 484 | 487 | 490 | 493 | 496 | 499 | 502 | 482 | 485 | 488 | 491 | 494 | 497 | 500 | 503 | 483 | 486 | 489 | 492 | 495 | 498 | 501 | 504 |
| 22 | 505 | 508 | 511 | 514 | 517 | 520 | 523 | 526 | 506 | 509 | 512 | 515 | 518 | 521 | 524 | 527 | 507 | 510 | 513 | 516 | 519 | 522 | 525 | 528 |
| 23 | 529 | 532 | 535 | 538 | 541 | 544 | 547 | 550 | 530 | 533 | 536 | 539 | 542 | 545 | 548 | 551 | 531 | 534 | 537 | 540 | 543 | 546 | 549 | 552 |
| 24 | 553 | 556 | 559 | 562 | 565 | 568 | 571 | 574 | 554 | 557 | 560 | 563 | 566 | 569 | 572 | 575 | 555 | 558 | 561 | 564 | 567 | 570 | 573 | 576 |
| 25 | 577 | 580 | 583 | 586 | 589 | 592 | 595 | 598 | 578 | 581 | 584 | 587 | 590 | 593 | 596 | 599 | 579 | 582 | 585 | 588 | 591 | 594 | 597 | 600 |
| 26 | 601 | 604 | 607 | 610 | 613 | 616 | 619 | 622 | 602 | 605 | 608 | 611 | 614 | 617 | 620 | 623 | 603 | 606 | 609 | 612 | 615 | 618 | 621 | 624 |
| 27 | 625 | 628 | 631 | 634 | 637 | 640 | 643 | 646 | 626 | 629 | 632 | 635 | 638 | 641 | 644 | 647 | 627 | 630 | 633 | 636 | 639 | 642 | 645 | 648 |
| 28 | 649 | 652 | 655 | 658 | 661 | 664 | 667 | 670 | 650 | 653 | 656 | 659 | 662 | 665 | 668 | 671 | 651 | 654 | 657 | 660 | 663 | 666 | 669 | 672 |
| 29 | 673 | 676 | 679 | 682 | 685 | 688 | 691 | 694 | 674 | 677 | 680 | 683 | 686 | 689 | 692 | 695 | 675 | 678 | 681 | 684 | 687 | 690 | 693 | 696 |
| 30 | 697 | 700 | 703 | 706 | 709 | 712 | 715 | 718 | 698 | 701 | 704 | 707 | 710 | 713 | 716 | 719 | 699 | 702 | 705 | 708 | 711 | 714 | 717 | 720 |
| 31 | 721 | 724 | 727 | 730 | 733 | 736 | 739 | 742 | 722 | 725 | 728 | 731 | 734 | 737 | 740 | 743 | 723 | 726 | 729 | 732 | 735 | 738 | 741 | 744 |
| 32 | 745 | 748 | 751 | 754 | 757 | 760 | 763 | 766 | 746 | 749 | 752 | 755 | 758 | 761 | 764 | 767 | 747 | 750 | 753 | 756 | 759 | 762 | 765 | 768 |

```
              1 2 ........................................ 96
8    BIT 1  ⎡ 1 0 ........................................ 1 ⎤
7    BIT 1  | 0 1 ........................................ 0 |
6    BIT 1  | 1 0 ........................................ 1 |
5    BIT 1  | 1 1 ........................................ 1 |
4    BIT 1  | 1 1 ........................................ 0 |
3    BIT 1  | 0 0 ........................................ 0 |
2    BIT 1  | 0 0 ........................................ 0 |
1    BIT 1  ⎣ 1 0 ........................................ 1 ⎦
↑
RAIL          TIME ────▶
```

FIG. 10A

```
              1 2 ........................................ 96
8    BIT 1  ⎡ 1 0 ........................................ 1 ⎤
7    BIT 1  | 1 1 ........................................ 1 |
6    BIT 1  | 0 0 ........................................ 0 |
5    BIT 1  | 1 1 ........................................ 1 |
4    BIT 1  | 1 0 ........................................ 0 |
3    BIT 1  | 0 1 ........................................ 1 |
2    BIT 1  | 1 0 ........................................ 0 |
1    BIT 1  ⎣ 1 1 ........................................ 0 ⎦
↑
RAIL          TIME ────▶
```

FIG. 10B

SWITCH ARCHITECTURE FOR DIGITAL MULTIPLEXED SIGNALS

FIELD OF THE INVENTION

The invention relates to switches and, more particularly, to multi-channel, non-blocking switches.

BACKGROUND OF THE INVENTION

Switches are employed in a wide variety of communications systems to route digital signals, such as voice, data, video, and audio signals, from one or more sources to one or more destinations. An NXM multi-port switch may be used to connect any of N input data channels to any of M output data channels. Each of the data channels may be assigned its own physical channel or multiple channels may be multiplexed onto a single physical channel in order to share the physical channel. A strictly non-blocking switch guarantees a connection path will be available between each input channel and each output channel without rearrangement of any existing connections among other ports. A crossbar switch is one example of a strictly non-blocking switch. Some applications, notably synchronous optical network (SONET) systems, require switches to provide, in addition to permutation capability exemplified by non-blocking performance, multi-cast or broadcast capability. That is, switches must feature the ability to switch data from any of the switch's input channels to several or all of its output channels. Providing non-blocking switching capability for large numbers of synchronous transport signals such as level one (STS-1), level three (STS-3), level twelve (STS-12), or other channels within a SONET system can be particularly challenging. SONET and STS-1 are known and discussed, for example, in U.S. Pat. No. 5,715,248 issued to Lagle et al, U.S. Pat. No. 5,781,320 issued to Byers, U.S. Pat. No. 5,742,605 issued to Norman, U.S. Pat. No. 5,383,196 issued to Morton, and U.S. Pat. No. 5,682,257 issued to Uchida, all of which are hereby incorporated by reference.

The number of physical channels (e.g., optical fibers, twisted wire pairs, or coaxial cables) required to carry a group of data channels is often minimized by multiplexing data channels onto a single physical channel, thus avoiding the capital expense associated with installing and maintaining additional physical channels. One consequence of such signal consolidation is the multiplication of data rates on the physical channel. When such high data rate signals are to be switched, the multiplexed data channels may be demultiplexed in order to accommodate the switching speed limitations of the device that is to physically switch data from an input channel to an output channel. For example, a ten-channel, one gigabit per second (Gbs) physical channel could be demultiplexed to ten 100 megabit per second (Mbs) data channels, thereby significantly reducing the switching speed requirements imposed upon the physical switch. There is, therefore, a tradeoff between the number of data channels that may be consolidated on a physical channel and the operating speed required of devices that switch the data channels. Additionally, restrictions on the number of physical input/output connections available to a switch tend to force the consolidation of data channels onto a limited number of physical channels. Restrictions due to input/output limitations are particularly evident at the integrated circuit package level, where designs are sometimes pinout limited. That is, although the specific desired circuit may physically fit within the integrated circuit's (IC's) size limitations, there are not enough input/output pins available accommodate all the signals that must be brought into or taken off of the circuit. Or, the input/output buffers required for that number of inputs and outputs may dissipate too much power. Additionally, the interconnection of various circuit elements on an IC, the interconnection's routing, presents greater difficulties as the complexity of the integrated circuit increases and there tends to be a tradeoff between pinout and size limitations.

In addition to the well known advantages of modular design, such as the reduction of design effort, the re-use of standardized, fully-tested, and therefore reliable modular building blocks, and economies of scale associated with the production of large numbers of modules, modular designs may permit a designer to balance the competing demands of input/output, device size, signal speed, and routing limitations.

A modular switch that accommodates input/output limitations, device switching speed limitations, routing, and device size limitations would therefore be highly desirable.

SUMMARY

In a switch in accordance with the principles of the present invention, switch modules, each of which includes a disassembly block, a switching core, and an assembly block, are combined to implement an N×M multi-port switch that effectively connects N input ports to M output ports and provides broadcast capability. Such switches may also be implemented as non-blocking switches.

In an illustrative embodiment, each switch module includes physical channels, referred to as input and output ports, each of which carries at least one input or output data channel. All the data channels have their respective data blocks organized in the same number of bit-packs. For example, if the data channels to be switched contain data organized in bytes, i.e., each data block is eight bits long, and the bit-packs (that are fractions of data blocks) are organized as single bits, i.e., each bit-pack is one bit long, eight modules, one for each bit-pack, will be combined to form a switch. Similarly, a thirty-two bit data block may be organized as thirty-two one-bit bit-packs, eight four-bit bit-packs, four eight-bit bit-packs, etc., with thirty two, eight or four modules, respectively employed to switch the data channels. Although data blocks may be organized as any number of bit packs and bit packs may be organized as any number of bits, for the ease of description, unless otherwise indicated, the following discussion will generally assume that a data block contains eight bits and a bit pack contains one bit.

A disassembler within each module disassembles, or "slices", the data blocks it receives into bit-packs, routing bit-packs from the channels to switching cores. For example, in a module that receives byte wide data blocks and operates on one-bit bit-packs, the disassembler slices each byte into eight bits and routes each of the bits to a different one of the switching cores within the eight switch modules that comprise such a switch.

A switching core within each module connects each input channel with each output channel at the bit-pack level. That is, each switching core is assigned a specific bit-pack upon which to operate, receives those bit-packs for all the channels and routes those specific bit-packs to the appropriate assembler, and, through the assembler, to an output channel. For example, in a switch that operates upon channels having byte-wide data blocks and switches at the bit level (one-bit bit-packs), one switching core will receive and switch the first bit of each byte from all the input channels, a second switching core will receive and switch the second bit from all the input channels, a third switching core will receive and switch the third bit from all the input channels, etc.

Assemblers within each module receive the switched bit-packs from each switching core and assemble the bit-packs into data blocks for each of the output channels.

BRIEF DESCRIPTION OF THE DRAWINGS

The above and further features, aspects, and advantages of the invention will be apparent to those skilled in the art from the following detailed description, taken together with the accompanying drawings in which:

FIG. 6 is a bit map that illustrates one possible organization of 768 channels for switching by a 768×768 switch such as the switch of FIG. 5;

FIGS. 10A and 10B are, respectively, input and output maps of a switching core in accordance with the principles of the present invention;

DETAILED DESCRIPTION

Figure 1:
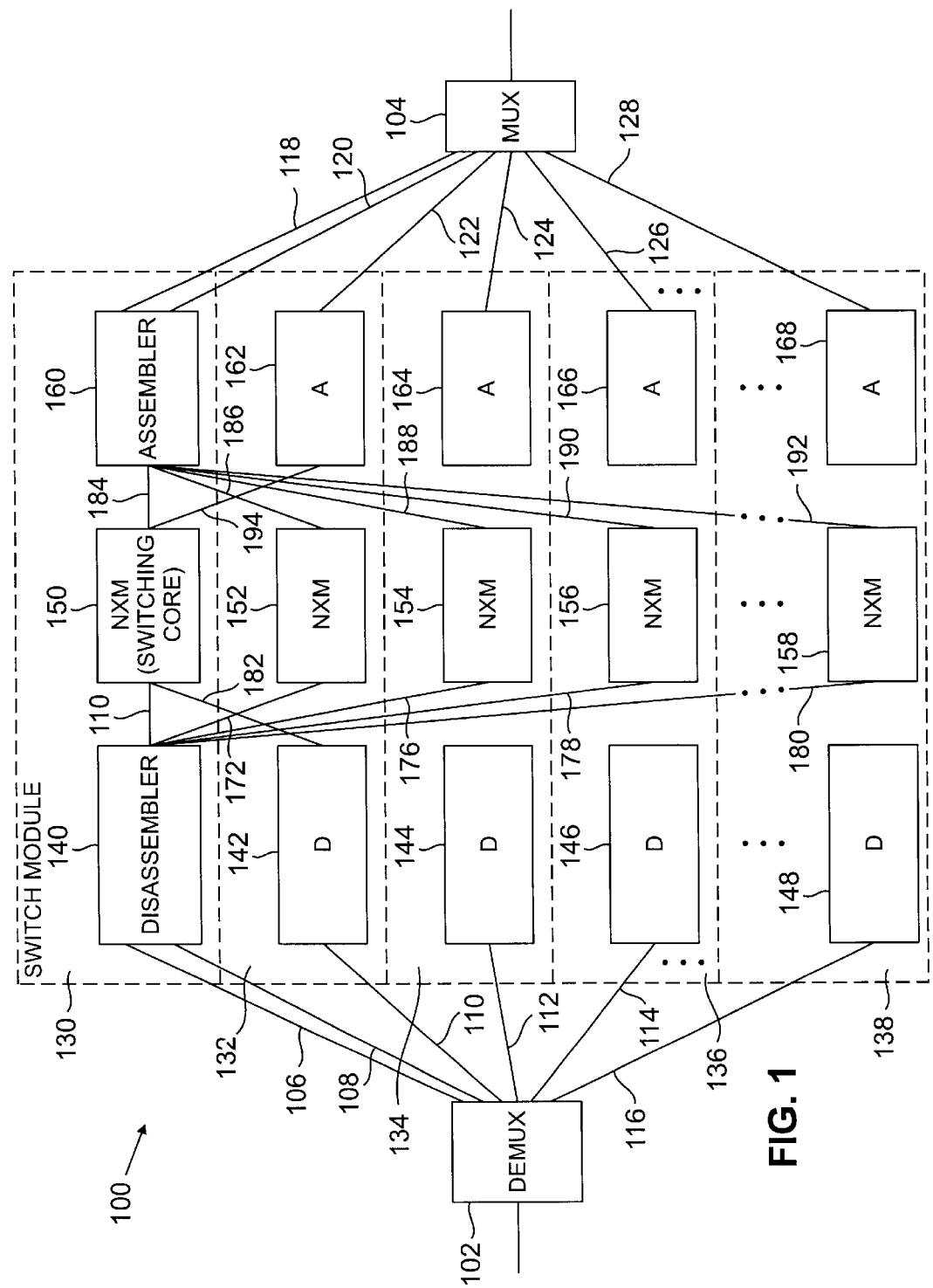
FIG. 1 is a conceptual block diagram of an N×M switch in accordance with the principles of the present invention.

Although data blocks may be organized as any number of bit packs and bit packs may be organized as any number of bits, for the ease of description, unless otherwise indicated, the following examples will generally assume that a data block contains eight bits and a bit pack contains one bit. The conceptual block diagram of FIG. 1 illustrates the basic organization of a strictly non-blocking N by M switch in accordance with the principles of the present invention. A switch 100 accepts data from an optional demultiplexer 102 and switches the data from each of the N input data channels to selected M output data channels. After switching, the output channels are routed to an optional multiplexer for concentration into a fewer number of physical channels. The switch includes N input data ports, 106–116 and M output data ports 118–128. The data ports 106–128 provide physical channels between the switch 100 and other devices, such as the demultiplexer 102 and multiplexer 104 of the illustrative embodiment. In the illustrative embodiment, each data channel is assigned its own data port. The data within each data channel is organized in data blocks composed of bit-packs. All data channels may have data organized as byte-wide data blocks composed of 1 bit, bit-packs, for example. The switch includes O switch modules 130–138, where O is the number of bit-packs in a data block. For example, O=8 when data blocks are 1 byte wide and bit-packs are 1 bit-wide, O=4 when data blocks are 1 byte-wide and bit-packs are 2 bits wide, and so on.

The O switch modules 130–138 each include at least 1 input port and 1 output port. In the illustrative embodiment, all switch modules have the same number of input ports and the same number of output ports. Some of these ports are omitted from FIG. 1 for clarity. The switch module 130 includes input ports 106 and 108 and output ports 118 and 120 and provide two physical channels each for input data channels to and output channels from the switch module 130. Each of the switch modules 130–138 includes a disassembler 140–148, which accepts data from the associated input ports, a switching core 150–158 which accepts and switches bit-packs from each of the disassemblers, and an assembler 160–168 which accepts switched bit-packs from each of the switching cores. Each of the switch module components will be described in greater detail below.

In accordance with the principles of the illustrative embodiment, when the switch module 130 receives a data block, e.g. a byte, the disassembler 140 slices the data block into bit-packs, e.g. bits, and distributes the bits to the various switching cores 150–158. Consequently, all the respective bit ones, twos, threes, fours, fives, six, sevens, and eights from data channels input to the disassembler 140 are respectively routed to the switching core 150, 152, 154, 156, . . . 158. The respective connection paths 170, 172, 176, 178, and 180 from disassembler 140 to switching cores 150–158 are illustrated in FIG. 1. A connection path 182, which provides a route for all bit ones from disassembler 142 to the switching core 150 is also illustrated. The remaining connection paths between the disassembler and switching cores have been eliminated from FIG. 1 for clarity. Similarly, the respective connection paths 184, 186, 188, 190, and 192 which carry the switched bits 1–8 for the assembler 160 are shown. A connection path 194 from switching core 150 carries a switched bit 1 from the switching core 150 to the assembler 162 which assembles switched bits 1–8 from respective switching cores 150–158. Switching cores 150–158 are connected to assemblers 160–168 and, in a similar fashion, several of the connection paths are omitted from FIG. 1 for clarity.

In operation, data from data channels is routed to the disassemblers 140–148 which bitwise slice the data (assuming one bit bit-packs) and send the sliced data to the switching cores 150–158, each of which switches all the respective bit data from all the input channels and distributes the switched bit data to the appropriate assemblers 160–168 for assembling into data blocks for the output ports 118–128.

Figure 2:
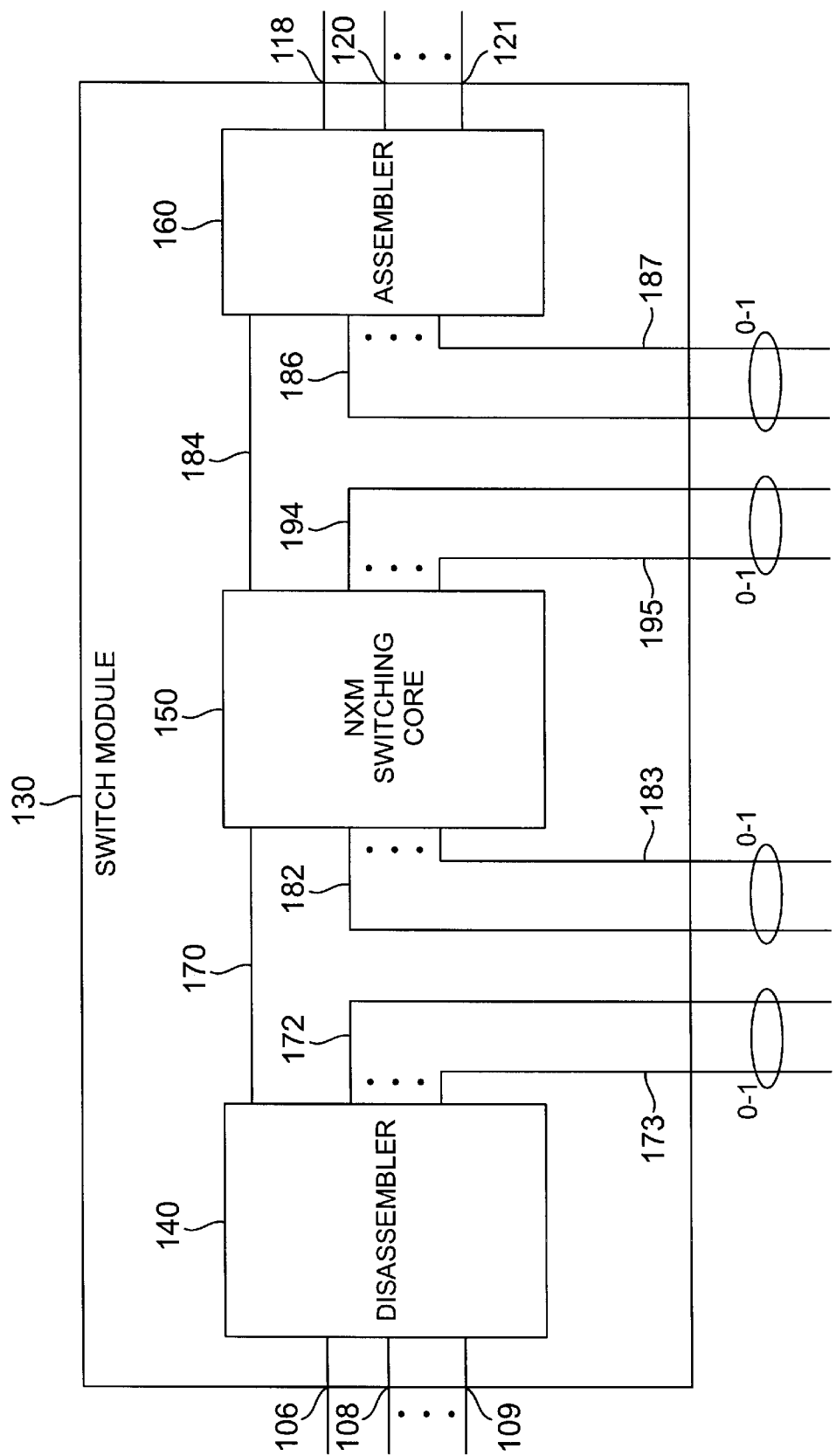
FIG. 2 is a functional level block diagram of a switching module in accordance with the principles of the present invention.

The block diagram of FIG. 2 provides a more detail view of a switch module, such as switch module 130 of FIG. 1, with like components having like designation numbers. Each switch module 130 may include N input ports 106, 108, . . . 109, and M output ports 118, 120, . . . 121. For example, in an illustrative embodiment where each data block is 8 bits wide, each bit-pack is one bit wide, and 768 input data channels are switched onto 768 output data channels, the number of input ports and output ports on each switch module would be 768÷8=96 input ports and 96 output ports. Data from each of these input ports is disassembled in the disassembler 140 and the disassembled bit-packs, e.g. single bits in a one bit bit-pack implementation, are distributed along the connections 170, 172, . . . 173, to an internal switching core 150, and switching cores of other switch modules (not shown). If only one data channel is disassembled within each disassembler, each of the connections 170, 172, 173, carries bit-pack data for only one data channel. On the other hand, if a plurality of data channels are accommodated by each switch module, each of the connection paths 170–173 may include bit-pack data from a plurality of data channels. The number of connection paths leading from the disassembler 140 to other switch modules is equal to the number of switch modules O–1, but each of the connection paths may carry a plurality of data channels. Additionally, each connection path may include a plurality of physical paths, such as wires, printed circuit traces, or conduction paths in an integrated circuit. The number of switch modules is determined by the number of bit-packs in a data block, e.g. 8 bits in a byte.

Similarly, a total of O–1 connection paths 182–183 link other disassemblers to the switching core 150, O–1, 194–195 connections link the switching core 150 to other assemblers, and O–1, 186–187 connection paths link other switching cores to the assembler 160. Each of these connection paths may transmit bit-packs from a plurality of data channels so that, for example, 8 connection paths 170, 182, . . . 183 may each carry bit-pack data from 96 data channels, thereby providing data for 768 data channels to the switching core 150. The disassembler 140 and assembler 160 may respectively include a demultiplexer and a multiplexer. With multiplexer and demultiplexer included in this example, the 96 input channels to the disassembler 140 may be carried on 8 physical channels, for example.

Figure 3:
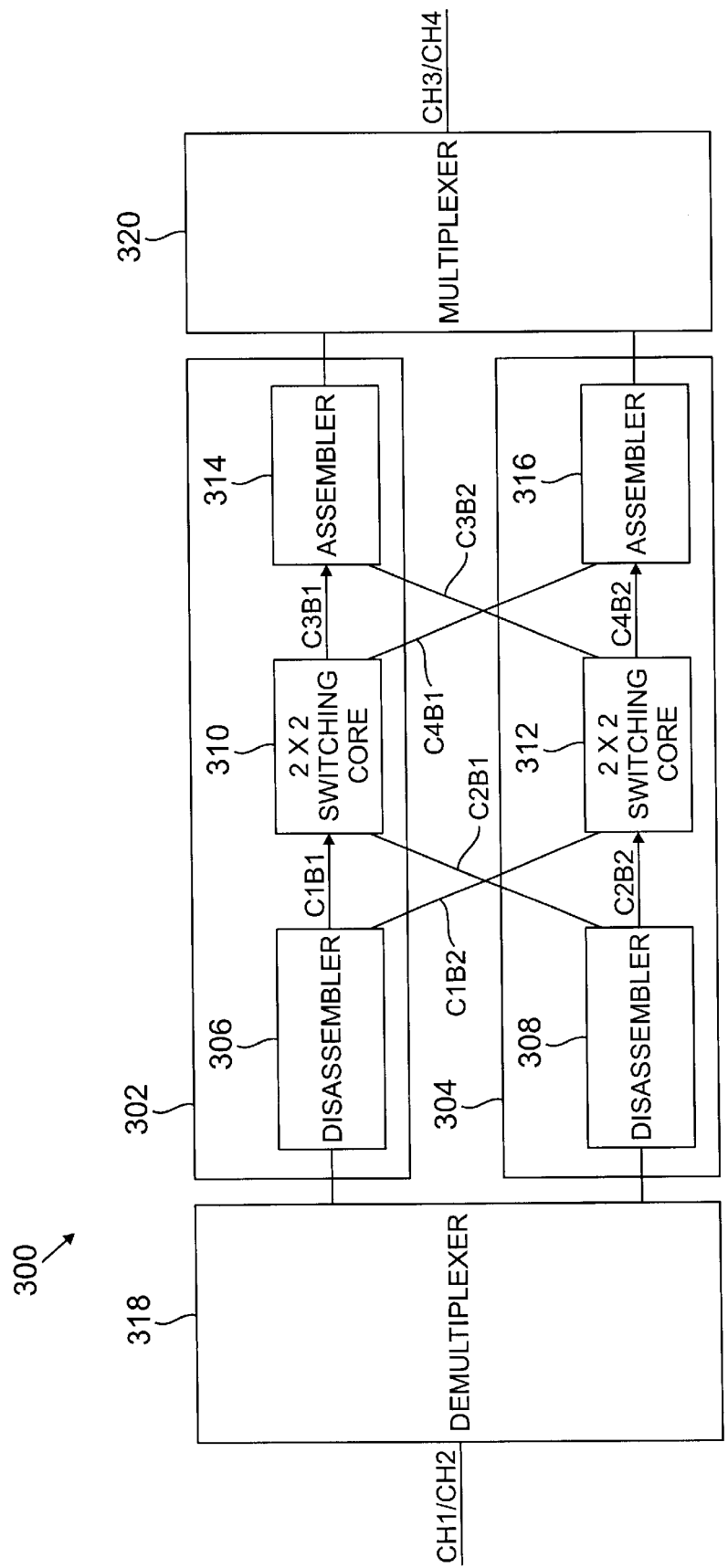
FIG. 3 is a functional level block diagram of a 2×2 switch that employs the switching modules in accordance with the principles of the present invention.

The functional level block diagram of FIG. 3 illustrates the structure of a 2 channel, 2-bit data block, 1-bit, bit-pack switch 300 in accordance with the principles of the present invention. The switch 300 includes switch modules 302 and 304. As previously described, each switch module 302 and 304 respectively includes disassemblers 306 and 308, switching cores 310 and 312, and assembler 314 and 316. A demultiplexer 318 receives input data channels ch1 and ch2 and demultiplexes the data, sending ch1 data to the switch module 302 and ch2 data to the switch module 304. The disassembler 306 disassembles each 2-bit data block into 1-bit bit-packs and respectively routes channel 1, bit-1 (c1$b$1) and channel 1, bit-2 (c1$b$2) to switching cores 310 and 312. Similarly, the disassembler 308 disassembles each 2-bit data block of channel 2 and respectively routes channel 2, bit-1 (c2$b$1) and channel, bit-2 (c2$b$2) to switching cores 310 and 312.

The switching cores 310 and 312 respectively switch bit-1 data from channels 1 and 2 to outgoing channels 3 and 4. Consequently, the switching core 310 routes channel 3, bit-1 (c3$b$1) and channel 4, bit-1 (c4$b$1) data to assemblers 314 and 316, respectively. Similarly, the switching core 312 routes channel 3, bit-2 (c3$b$2) and channel 4, bit-2 (c4$b$2) data to assemblers 314 and 316, respectively. Assemblers 314 and 316 respectively assemble the channel 3 and channel 4 bit-packs into 2-bit data blocks which are transferred to the multiplexer 320. The multiplexer 320 multiplexes data blocks from channels 3 and 4 and produces an out put data stream ch3/ch4.

Figure 4:
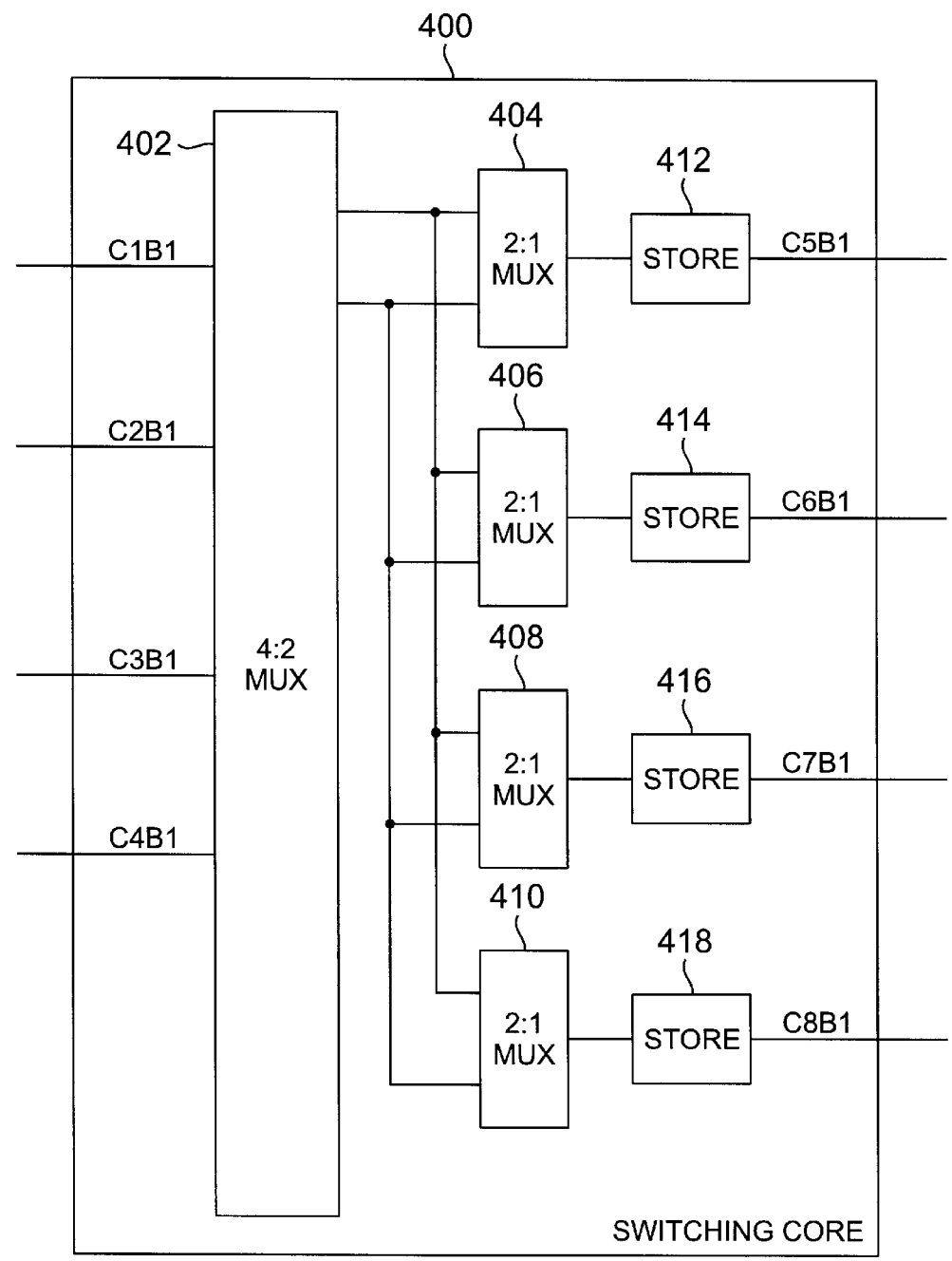
FIG. 4 is a functional level block diagram of a space/time switching core in accordance with the principles of the present invention.

A conceptual block diagram of a 4×4 switching core 400 in accordance with the principles of the present invention is illustrated in FIG. 4. The switch 400 is a space/time switch in that it combines physical, or space, switching with time switching in order to accommodate the competing demands of signal speed and switch size limitations. That is, a switch may be made physically smaller if bit-packs can be switched sequentially, using time switching. At the same time, high speed signals can be switched when the switching takes place in parallel, using space switching. As will be apparent from the examples to follow, one factor may be traded off against the other to obtain an appropriate mix of size and speed for a given implementation.

In this illustrative embodiment, the first bits of 4 input channels, c1$b$1 through c4$b$1 are switched to the first bits of 4 output channels, c5$b$1 through c8$b$1. A 4 to 2 multiplexer 402, multiplexes bit-pack, first bits routed to the switching core 400 from various disassemblers, to 2 to 1 multiplexers 404, 406, 408, and 410. In this illustrative embodiment, during the first time slot, the multiplexer 402 selects bits c1$b$1 and c2$b$1 and routes those bits to 2 to 1 multiplexers 404–410. During the second time slot, the multiplexer 402 selects bits c3$b$1 and c4$b$1 and routes them to the 2 to 1 multiplexers 404–410. In this manner, each of the 2 to 1 multiplexers 404–410 may select any input, c1$b$1 through c4$b$1 to latch into a storage area 412–418, respectively. The storage areas 412–418 are often depicted, and will be hereinafter, as a switch matrix that may correspond to a combination of time slots and physical connection paths referred to as rails. Instead of switching bits in two time slots, as in this illustrative embodiment, all bits could be switched in a single time slot by replicating a 4 to 1 multiplexer for each output bit location 412–418. However, such an embodiment might require higher speed circuitry and may consume more space. If the space and high-speed circuitry are available, such a switch may be incorporated as a switching core within a switch module in accordance with the principles of the present invention. As will be apparent from the following examples, different scales, e.g., much larger switches, and different levels of multiplexing are contemplated within the scope of the invention.

Figure 5:
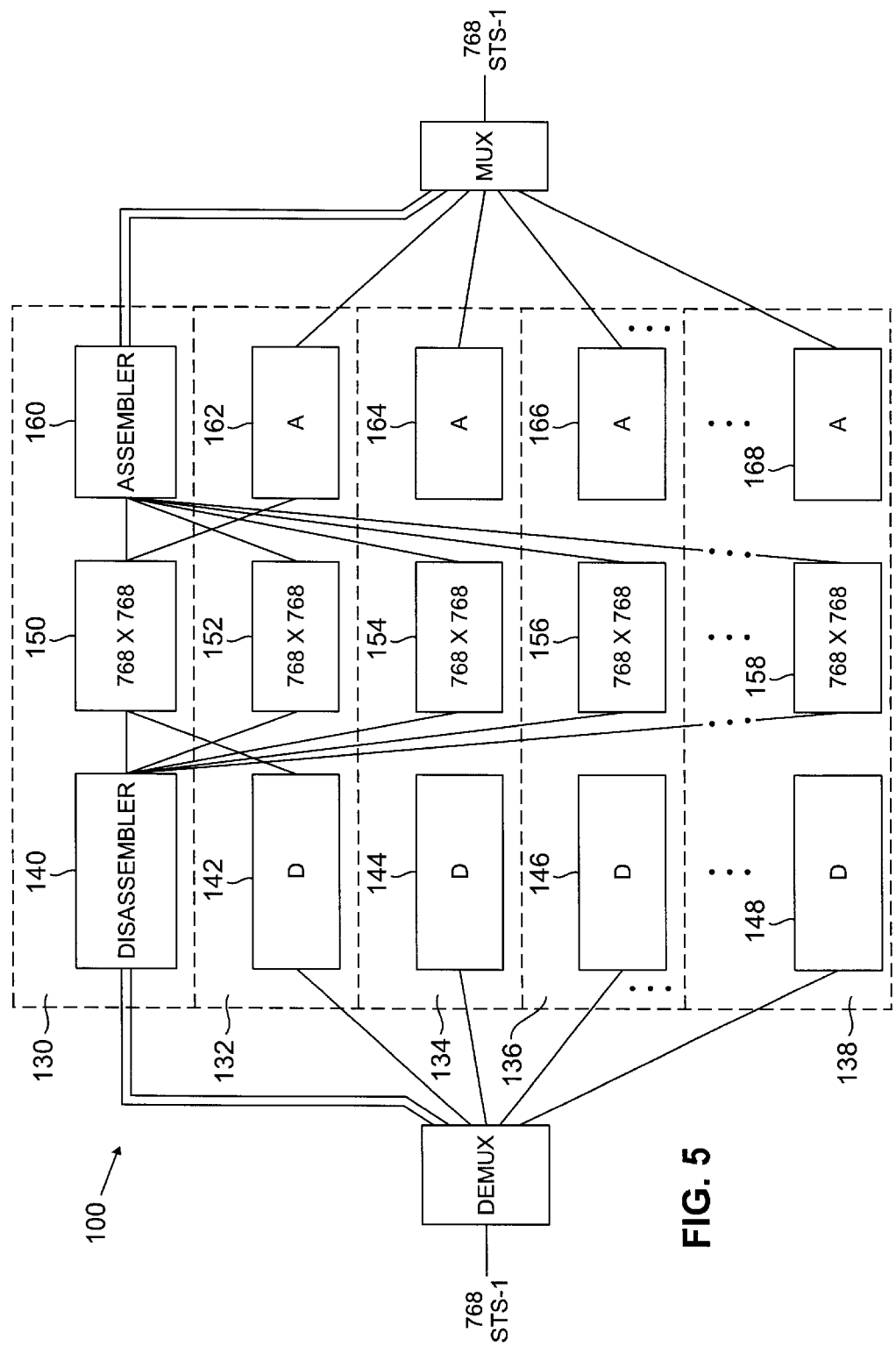
FIG. 5 is a functional level block diagram that depicts a combination of switching modules that comprise 768×768 non-blocking SONET switch.

The new, modular, non-blocking switch is particularly suited to complex applications, such as the non-blocking switching of 768×768 STS-1 channels within a SONET system. In the illustrative embodiment of FIG. 5, where like elements have like reference numbers, the modular switch accommodates board pin, device pin, device-size and power dissipation limitations by employing a bit-slice approach (e.g., each bit-pack is one bit wide). In this illustrative embodiment the switch includes eight switch modules, with one switching core for each bit. Each disassembler within each switch module disassembles data from 96 STS-1 channels, distributing the data bits from all the channels to the appropriate switching core: For example, all first bits from all 768 channels may be routed to the first module's switching core 150 for switching, second bits from all 768 channels may be routed to the second module's switching core 152 for switching, etc.

In the following example it is assumed that all the 768 STS-1 signals are synchronized to a single clock in a stage prior to the switch comprising the eight switch modules. Although, in the illustrative embodiment, the modular switch operates on bit sliced data that is sliced one bit wide, that is, one bit bit-packs are employed, the same considerations would apply to a device which operates on 2 bit bit-packs.

Within each switching core 150–158 all the relevant bits (e.g., bit 1's for switch module 130, bit 2's for switch module 132, etc.) are illustratively input to the switching core on 16 rails in 48 time slots (note that 16×48=768). Each rail is carrying data at the rate of 311.04 Mb/s. In this manner, the data rate of 768 STS-1 signals can be accommodated by 8 such devices. That is, since the transmission rate of an STS-1 signal is 51.84 megabits per second (Mbps), 768 such signals would yield a transmission rate of 39.81 Gigabits per second (Gbps). Because each device's switching core operates on one bit of each of the 768 channels in parallel, with each bit being processed at a rate of (number of rails per switching core)×(number of switching cores)×(switch processing speed)=16×8×311.04 Mbps=39.81 Gbps, the data rate of 768 STS-1 signals. Internal to each switching core, the data may be demultiplexed onto 32 rails operating at half the rate: 155.52 Mb/s. In that case, the 768 bits would be available over 32 rails in 24 time slots (note 32×24=768). Such demultiplexing can be continued further where data is carried over twice as many rails, each operating at half the rate.

The input data bits of the illustrative embodiment can be represented by a matrix such as shown in FIG. 6, in which each row represents a rail and each column represents a time slot. Each incoming STS-1 signal's data bit may be placed by a rail number and a slot number. Such a matrix will be referred to hereinafter as an input bit map. Similarly, the switches output may be represented by an output bit map in which each outgoing STS-1 channel is identified by an outgoing rail number and time slot number.

The switch operates under the control of a switch control map which specifies the source, which may be an STS-1 number or the incoming rail and slot number in the matrix representation of FIG. 6 for each of the 768 bits in the output bit map. Assuming that the data rails have been demultiplexed as indicated above and are represented by the matrix of FIG. 6, the row numbers would span the range of 1–32 and time slot numbers span the range of 1–24. Thus, a 10 bit number corresponding to each output bit can represent the source for the output bit and consequently, the switch control map could be implemented by storing 7680 bits. If, for example, the switch control map contains rail 2, slot 21 in all 768 entries, input bits from rail 2 slot 21 would be broadcast to all the output channels. If all the 768 entries in the switch control map are unique, that would correspond to a permutation network because each of the output bits are being sourced from a different location. The switch may accommodate any combination of mixture of broadcast and permutation.

Each of the switching cores 150–158 could be implemented as a single stage space switch. In this case, the incoming bits would be stored for 24 time slots in order to make all the 768 bits available for switching. Once all the bits were available, a 768×768 crossbar switch would then be operated to assemble the output bit map. The bits in the output bit map are then sent out on the 32 rails during the next 24 time slots while the input bit map storage is being filled with new data. This requires the equivalent of 768×768=589824 crosspoints.

As noted above, the switching cores may be implemented using a space/time switching architecture in order to reduce the size of the switching cores. For example, Instead of operating the crossbar switch only once every 24 time slots (i.e., once every 24×6.43 ns=154.32 ns) the switch could be operated, or reconfigured, in every time slot. This would permit a twenty four-to-one reduction in the size of the switching cores. In the illustrative 768×768 embodiment, each such time-multiplexed switching core would be roughly equivalent in size to a purely space switch having 768×768/24=24576 equivalent crosspoints. The time-multiplexed, or space/time, implementation would include additional timing and control complexities, but may offer other advantages.

Figure 7:
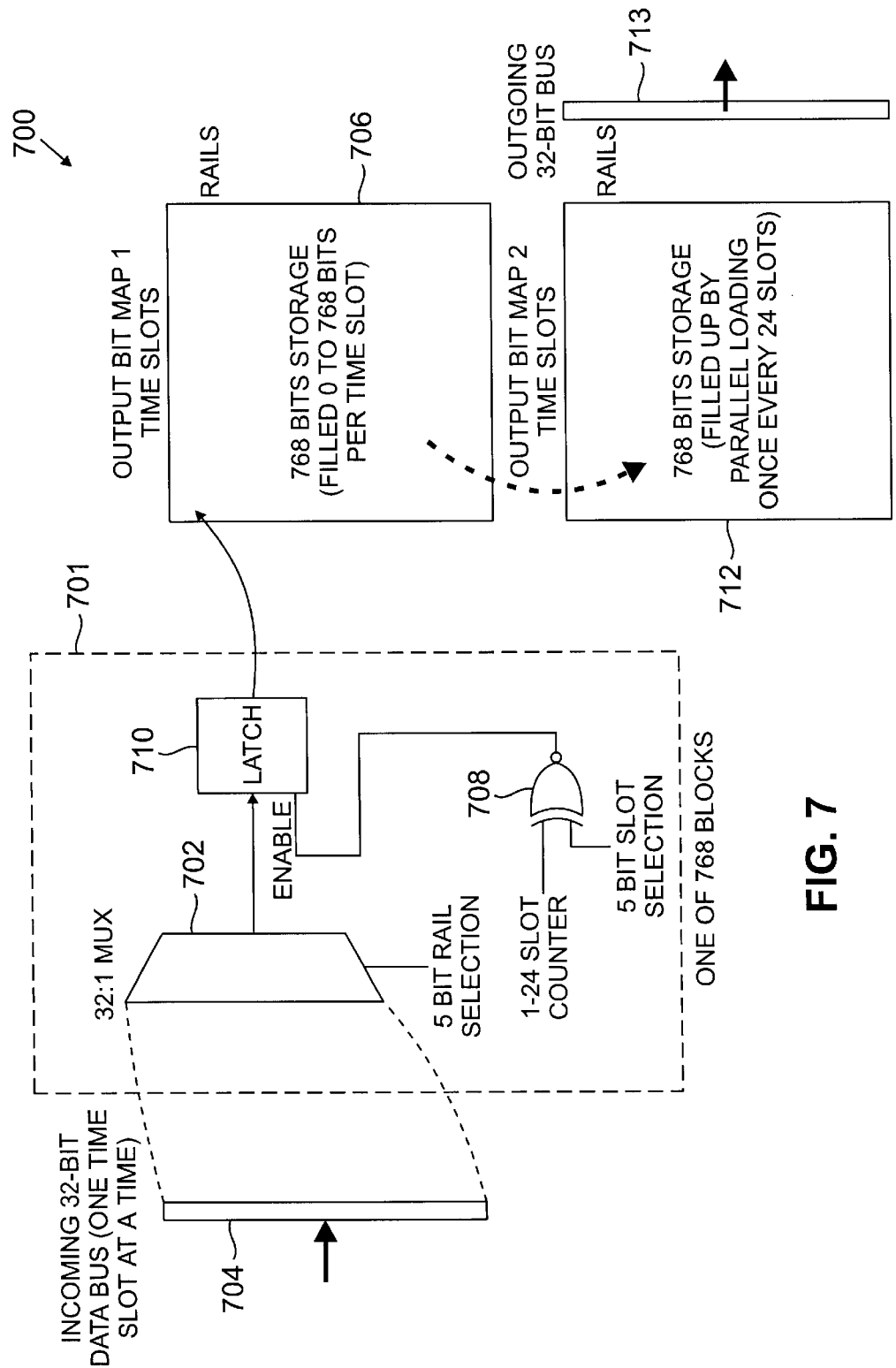
FIG. 7 is a functional level block diagram of a switching core in accordance with the principles of the present invention.

Such space/time switches may be implemented in a variety of configurations, with different combinations of rails and time slots. FIG. 7 provides a conceptual block diagram of an illustrative embodiment of such a space/time implementation 700, which will be referred to hereinafter as an expander space/time switch. Such a configuration employs a selection block 701 for each of the seven hundred and sixty eight locations in the switch core's output bit map. In the illustrative embodiment, each selection block 701 employs a 32 to one multiplexer 702 to select one of 32 rails. The selected rail may remain the same in all 24 time slots 704 because control circuitry, illustrated at the functional level as a combination of an "exclusive or" gate 708 and latch 710, is associated with each of the seven hundred and sixty-eight multiplexers 702 and serves to latch into the output bit map 706 the desired bit of the seven hundred sixty eight bits input to the multiplexer over the course of twenty four time slots. That is, each 32 to 1 multiplexer selects one of 32 rails and the latching action of the control circuitry (that is, gate 708 and latch 710) selects the desired time slot of the 24 time slots. Consequently, the appropriate bit of 768 input bits, one of 32 in any one of the twenty four time-slots, may be selected for writing into a location within an output bit map 706.

Since all seven hundred sixty eight input bits, one bit from each input channel, are sent to each of the selection blocks 701, any one bit may be sent to all the locations within the output bit map 706. That is, the switching core 700 may be used to broadcast data from any input channel to all the output channels. For example, if the selection block 701 points to rail 1, slot 1 in the output bit map 706 and its source, determined by a switch control map as previously discussed, is rail 8, slot 19 of an input bit map (not shown), the five bit control input to the multiplexer 702 could select rail 8 to appear at the output of the multiplexer 702 during all twenty four time slots. The enable circuit, functionally represented by the exclusive or circuit 708, would then activate the latch 710 only during incoming slot 19, thus selecting the bit appearing on rail 8 in time slot 19 for output to rail 1 time slot 1. In this illustrative embodiment, after 24 time slots, all the input bits have been switched to the appropriate location within the output bit map 706. The output bit map 706 may then be parallel-loaded into another bitmap 712, which operates to buffer the output data and to allow the bitmap 706 to be loaded with output data for the next successive twenty four time slots.

The regularity of the seven hundred and sixty eight selection blocks 701 can be exploited to organize them into small, efficiently laid-out cells that are used repeatedly in an integrated circuit implementation. That is, each of the eight switching cores employed in this illustrative embodiment may be implemented in a variety of integrated circuit implementations, whether all eight modules are packaged within a single integrated circuit, a single integrated circuit contains a single module, or each module is distributed throughout a plurality of integrated circuits. Regardless of packaging, each of the switching cores could be organized in any one of a number of efficient layouts.

Figure 8:
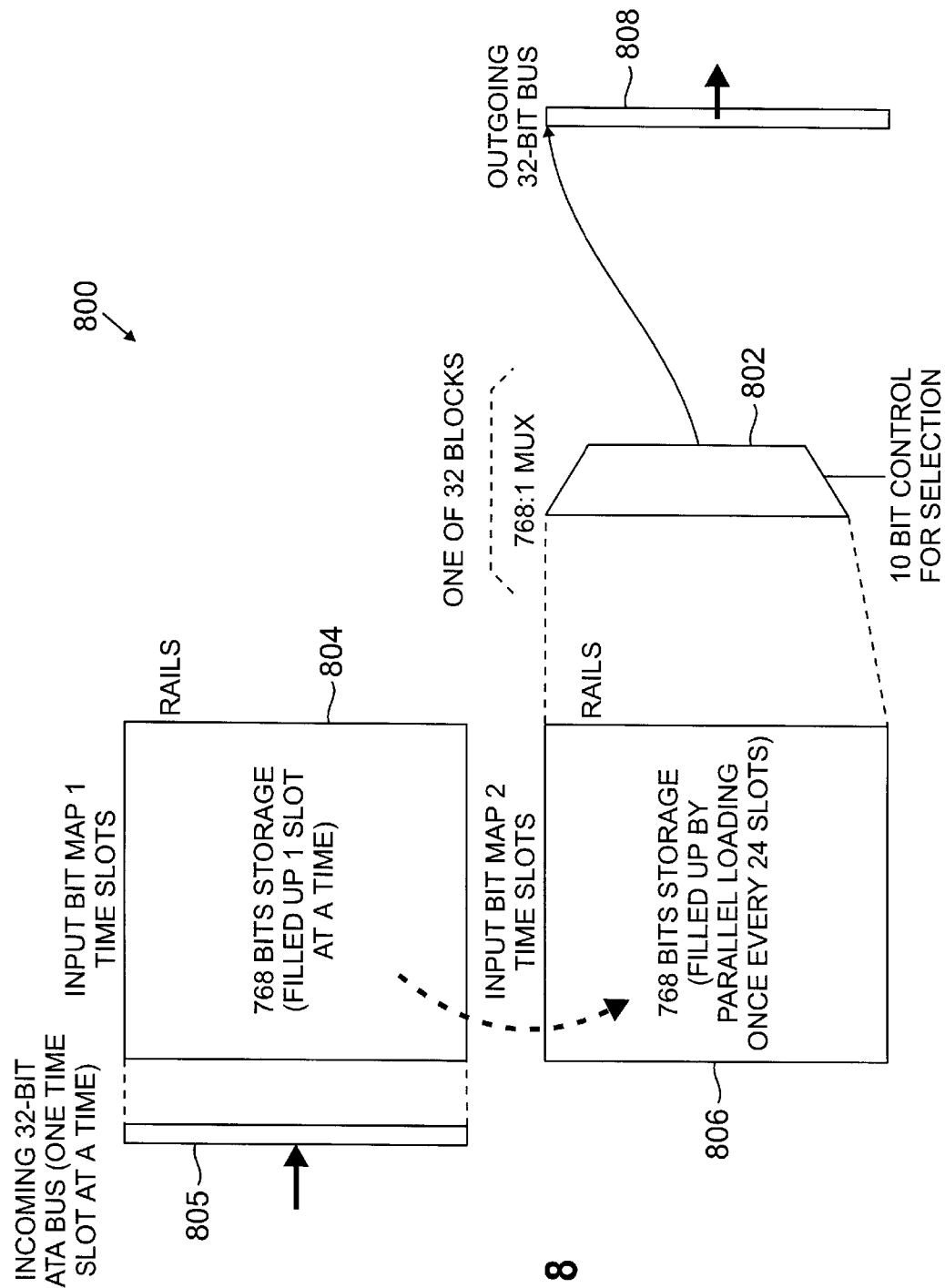
FIG. 8 is a functional level block diagram of an alternative embodiment of a switching core in accordance with the principles of the present invention.

An alternative switching core 800 is illustrated in the functional level block diagram of FIG. 8. This illustrative embodiment of the switching core employs thirty-two 768:1 multiplexers 802. In this embodiment an input bit map 804 is loaded from a 32 bit bus 805 (one rail per bit) in one step for each of twenty four time slots. Once the input bit map 804 is thus filled with one bit from each of seven hundred and sixty eight channels, the contents are shifted in parallel to a duplicate input bit map 806. Each of the thirty-two multiplexers 802 transfers a selected bit to a thirty-two bit output data bus 808 during each of 24 time slots. That is, in any time slot, data for the outgoing data bus 808 is generated by the 32 multiplexers. Each multiplexer 802 has access to all the 768 input map bits and is dedicated to generating one rail of the output bus. The 10 bit control input to each multiplexer will typically change in during each time slot. Therefore, In each time slot no more than 320 control bits of the 7680 bits needed for the switch control map are active, and the switch control map could be implemented, for example, in area-efficient dual port RAM. In the illustrative SONET application the multiplexers 802 must operate at 155 Mbs or other steps must be taken to accommodate the SONET data rate. For example, a retiming stage could be added, with corresponding changes in the timing of the multiplexer control bits.

Figure 9:
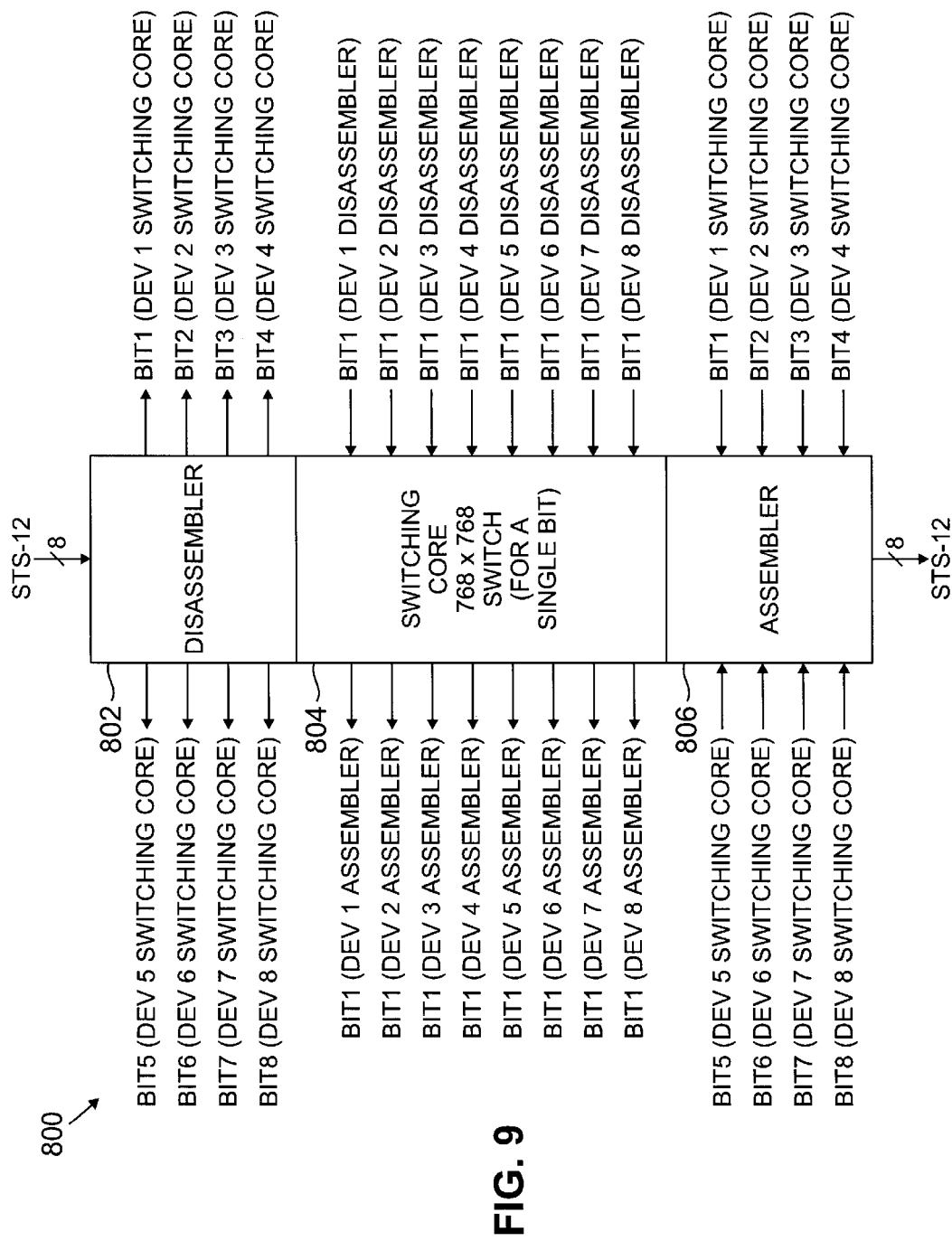
FIG. 9 is a block diagram of a switching module in accordance with the principles of the present invention which depicts the interconnection paths for one switching module of an eight-module switch.

The functional level block diagram of FIG. 9 provides a more detailed view of the interconnection paths of one of eight switch modules employed in a 786×768 non-blocking SONET STS-1 switch. The switch module 800 includes a disassembler 802, a 768×768 single bit switching core 804, and an assembler 806, all of which are implemented in accordance with the principles of the present invention as previously described in the discussions related to disassemblers, switching cores, and assemblers. In this illustrative embodiment, each switch module is implemented on a separate integrated circuit and each disassembler and assembler respectively include a demultiplexer and multiplexer.

Each module 800 receives eight STS-12 inputs at the disassembler 802 and provides eight STS-12 outputs at the assembler 806. Since each STS-12 signal consists of 12 STS-1 multiplexed signals, the 8 inputs contain an equivalent of 8×12=96 STS-1 signals. A switch comprising 8 switch modules 800 can therefore connect 768 STS-1 input channels to 768 STS-1 output channels. In this illustrative embodiment, the disassembler 802 demultiplexes the eight STS-12 channels into 96 STS-1 channels and disassembles the data blocks (bytes) of the 96 STS-1 channels into bit-wide slices. After slicing the incoming signals in this manner, the disassembler 802 serially multiplexes "vertical slices", i.e., bit-wide bit-packs, of all the 96 STS-1 signals and outputs them on the vertical output labeled BIT1. The parenthetical "dev 1 switching core" indicates that the disassembled bit packs are routed to the switching core of device 1. Consequently, BIT1 data will be routed to the device 1 switching core 804, BIT2 data will be routed to a device 2 switching core (not shown), etc. Thus, the information on all the 96 incoming STS-1 channels is output on the eight bit-wise outputs of the disassembler. The bit rates on the eight input and the eight output rails of the disassembler are identical, but the formats are different; the inputs are ("horizontally sliced") byte interleaved STS-12s (that is, 8 out of a total of 64 STS-12s) and the outputs are ("vertically sliced") bit-interleaved STS-1s, where output has only one bit pack. An input rail has all the bits from an STS-12 (or 12 STS-1s), an output rail has only bit 1s but from all 96 STS-1s.

To clarify further, the STS-12 inputs have 12 multiplexed bytes (one byte from each STS-1, each byte is 8 bits) and thus have a periodicity of 96 bits. As mentioned above, the disassembler's bitwise outputs also have a periodicity of 96 bits because each disassembler operates on 96 STS-1s. The switching core 804 is a one bit 768×768 switch. It receives inputs with a periodicity of 96 on each of the eight rails (i.e. 8×96=768 bits per period), switches them according to a control map and outputs the results on eight outgoing rails, again each with a periodicity of 96. One can visualize the inputs as an 8 row by 96 column matrix of input bits which are rearranged per the switch control map into an outgoing 8 row by 96 columns matrix. This periodicity is illustrated in the input and output maps of FIGS. 10A and 10B, respectively. In the input map 10A, each row contains bit 1s from the disassembler of one of the eight devices. Horizontal axis represents the time axis. Each entry in this matrix represents a different channel due to the multiplexing by the disassembler. Switching amounts to being able to direct any bit in the input map to any location in the output map. Depending on the design of the switch block one can accomplish broadcasting, multi-casting, one to one switching or shutoff or a combination of these under the command of the switch control map.

In this illustrative example, each switch module 800 contains one eighth of the overall switch function. The strictly non-blocking characteristic of the switch comes from the design of this block. However, switches in accordance with the principles of the present invention need not be non-blocking.

Returning to FIG. 9, the assembler 806 assembles the eight bit-wise multiplexed inputs into bytes of 96 STS-1 and then further multiplexes them into eight STS-12 signals. This function is an inverse of the disassembler function. The input signals arrive from eight switching cores, each containing a different bit (bits 1 through 8) with a periodicity of 96. Each of the modules 800 may include conventional functional blocks, such as clock recovery, clock domain alignment, controller interface, switch control map, etc., (not shown). As noted above, the interconnections among the eight devices for this illustrative embodiment are indicated parenthetically in FIG. 9. Note that:

(1) The disassembler 802 operates on all the bits of the incoming (source) eight rail slices of STS-12 signals.

(2) The switching core 804 operates on bit 1 of all the STS-1s for the entire switch.

(3) The assembler 806 operates on all the bits of the outgoing (destination) eight rail STS-12 slice.

Figure 11A:
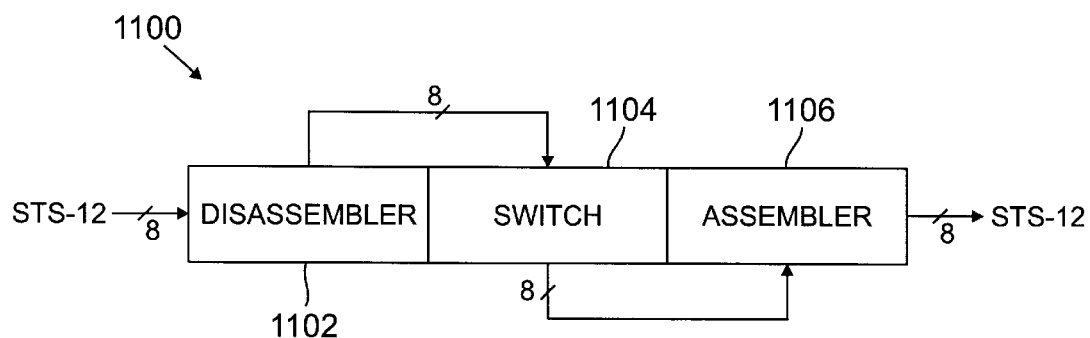
FIGS. 11A and 11B are, respectively, a block diagram representation of a 96×96 SONET switch that employs only one switching module, and the corresponding input/output matrix.
Figure 11B:
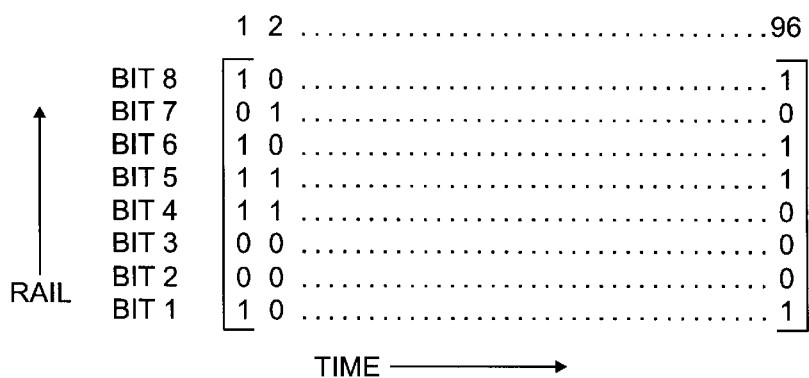

As illustrated in the conceptual block diagram of FIG. 11, a single switch module 1100, such as switch module 800 of FIG. 8 may be connected to produce a 96×96 STS-1 switch. In such an embodiment, all the outputs from the disassembler 1102 are connected to the inputs of the switching core 1104 and all the outputs from the switching core 1104 are connected to the inputs of the assembler 1106. The corresponding input/output matrix is shown in FIG. 11B. In this illustrative embodiment, rather than switching single bits for each input channel (STS-1 signal), as in the example of FIG. 9, the single switching core 1104 switches all the 8 bits of the input channels to all the locations within the output channels. Because this is a 96×96 switch, the switch map may be rearranged (such as broadcasting, multicasting, one to one or shutoff) only within the same row and not across the rows. Similar connections may be employed to realize a 192×192 STS-1 switch using just two switch modules, or a 384×384 switch using four switch modules.

Figure 12:
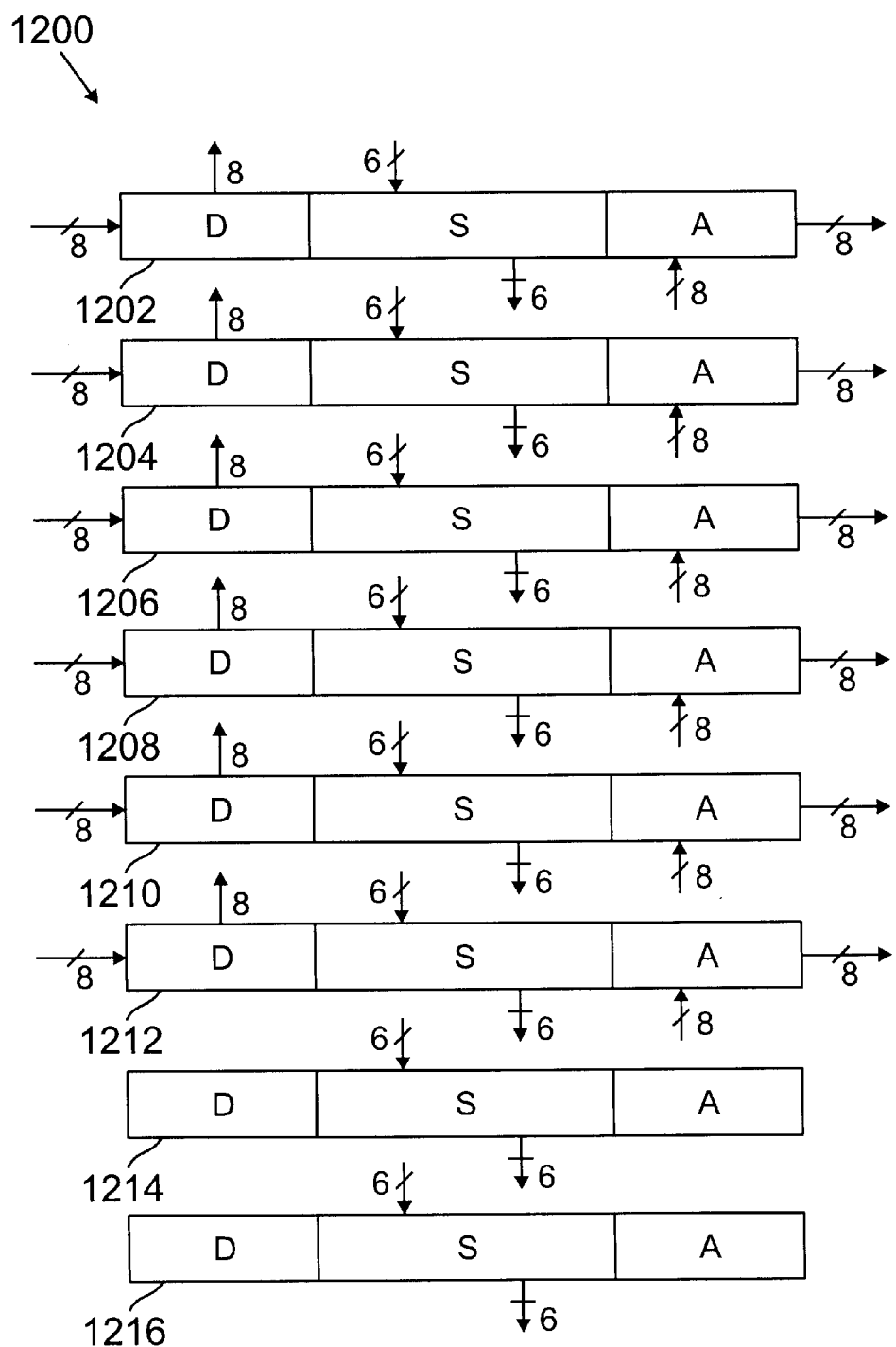
FIG. 12 is a functional level block diagram of an eight-module 576×576 SONET switch.

The flexibility of the new switch module is further illustrated by the embodiment of FIG. 12 in which eight switch modules 1202–1216 are employed to form a 576×576 STS-1 switch. As previously described, each of the switch modules includes a disassembler, a switching core, and an assembler, respectively labeled D, S and A in this figure. Each of the six modules 1202 through 1212 is connected to receive 8 STS-12 inputs and transmit 8 STS-12 outputs. This configuration provides switching for 576 STS-1 signals.

Each disassembler in modules 1202–1212 splits the input signals into eight separate bits and outputs them (bitwise multiplexed) onto eight rails which fan out to the switch sections of the eight devices. Thus, the six disassemblers output 6 modules×8 rails=48 rails. The 48 rails are connected to the eight switching cores, each with six input rails per switch module. The switch outputs are similarly connected to the assembler inputs. Even though the switch modules are being used for a 576×576 switch in this illustrative embodiment, the periodicity remains the same as for the 768×768 switch and no changes in the clock rates or timing are needed for this or other similar applications. Note that the disassembler D and assembler A in the last two modules, 1214 and 1216, are not being used in this example.

Figure 13A:
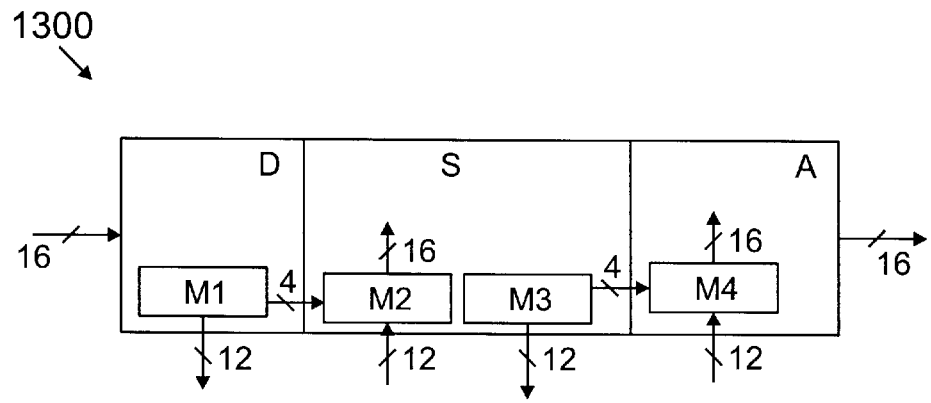
FIGS. 13A and 13B are, respectively, a functional level block diagram of a multi-bit switching module, and a 768×768 SONET switch employing four of such modules.

The functional level block diagram of FIG. 13 illustrates the basic functional components of a multi-bit switch module which may be used to implement a 768×768 STS-1 switch in accordance with the principles of the present invention using four (or less) switch modules. Since a switch control map is employed for each switch module, this approach not only reduces the number of switch modules in such a switch, but reduces the number of switch control maps that must be replicated by a like amount: from eight to four. Alternatively, the switching cores may operate on fraction of a bit, such as every alternate bit (case of "half bit") to make a larger (1536×1536) switch fabric in twice as many devices. Furthermore, if the signals from the disassembler that are intended for the switching core within the same module are routed internally through a multiplexer, the number of input and output pins may be reduced, resulting in lower power consumption and reduced board congestion.

Four switch modules such as switch module 1300 may be connected to realize a 768×768 STS-1 switch, as will be discussed in relation to FIG. 13B. The switch module 1300 receives sixteen STS-12 channels at the inputs of the disassembler D. These signals are disassembled into bitwise multiplexed 16 output rails. Each pair of rails carries a different bit (such as bit 1, bit 2, . . . bit 8) from 192 STS-1s. The switching core S contains circuits for switching 2 bits of 768 bit maps. Therefore, out of the sixteen rails connected to the switch input, four are from the disassembler D within the same module. These four rails can be internally connected from the disassembler block to the switch block.

A multiplexer M1 can be set such that for module 1 1302 application, the 4 intra-device rails carry bits 1, 2 and for module 4 1308 application they carry bits 7, 8. The 12 inter-device outputs of disassembler D for module a 1304 application carry bits 3, 4; 5, 6; 7, 8 respectively while they carry bits 1,2; 3 4; 5 6 respectively for module 4 1308 application. Interconnection with other modules in connection with this illustrative embodiment will be discussed in greater detail in relation to FIG. 13B. A multiplexer M2 directs the intra-module inputs from the disassembler D to the first 192 inputs of the switching core S for module 1, while for module 2 application, M2 directs the intra-module inputs to STS-1 input numbers 193–384. Furthermore, for module 1 application, M2 directs the 12 external inputs (in groups of 4) to switch input numbers 193–384, 384–576 and 577–768 respectively. For module 2 application, M2 directs the 12 external inputs (in groups of 4) to switch input numbers 1–192, 384–576 and 577–768 respectively. The requirements for M2 for module 3 and module 4 applications can be similarly derived.

For module 1 application, the four intra-device connections of multiplexer M3 carry information from STS-1 output numbers 1–192. For module 3 application, the four intra-device rails from M3 carry information from output numbers STS-1 385–576. For module 1 application, the 12 external outputs carry (in groups of four) information for STS-1 output numbers 193–384, 384–576 and 577–768 respectively. For module 3 application, the 12 external outputs of M3 carry (in groups of four) information for STS-1 output numbers 1–192, 193–384 and 577–768 respectively.

For module 1 application, the four intra-module outputs from the switch to M4 are directed to bits 1, 2 inputs. For module 2 application, the four intra-module outputs from the switch are directed to bits 3, 4 inputs. For module 1 application, the 12 external inputs are directed (in groups of four) to bits 3, 4; 5 6 and 7, 8 respectively. For module 2 application, the 12 external inputs are directed (in groups of four) to bits 1, 2; 5, 6 and 7, 8 respectively.

Figure 13B:
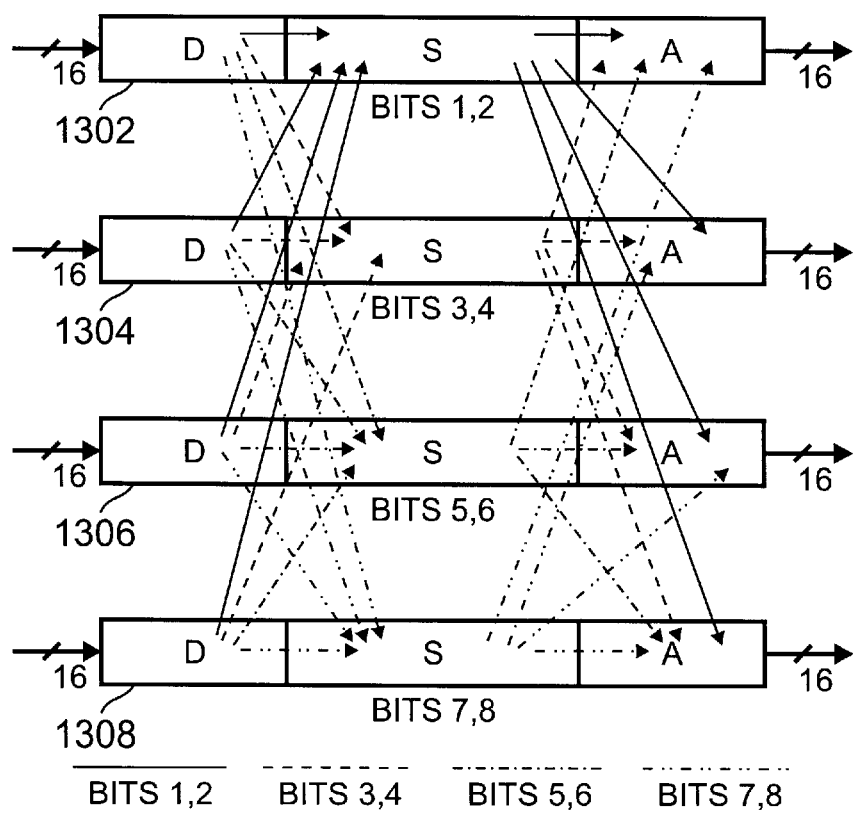

As illustrated in FIG. 13B, the switching core of module 1302 operates on bits 1 and 2. Similarly, the switching core of device 1308 operates on bits 7, 8 of all the 768 STS-1s. Thus, in the case of module 1302, the intra-device connections from the disassembler D to the switching core S bring bits 1, 2 from first (16 STS-12×12 STS-1=) 192 STS-1s, while in the case of module 1308, the intra-device connections bring bits 7, 8 from the last 192 STS-1s. The multiplexer M1 shown in FIG. 13A may be set such that, for module 1302 application, the 4 intra-device rails carry bits 1, 2 and for module 1308 application they carry bits 7, 8. The 12 inter-device outputs of the disassembler D for Module 1302 application carry bits 3, 4; 5, 6; 7, 8, respectively, while they carry bits 1,2; 3 4; 5 6 respectively for module 1308 application. Further inter- and intra-module connections should be apparent from the discussion related to FIGS. 13A and 13b. Multiplexers may be employed for intra-module (intra-device in an integrated circuit switching module implementation) connections in single bit, or multi-bit switching core implementations.

Figure 14A:
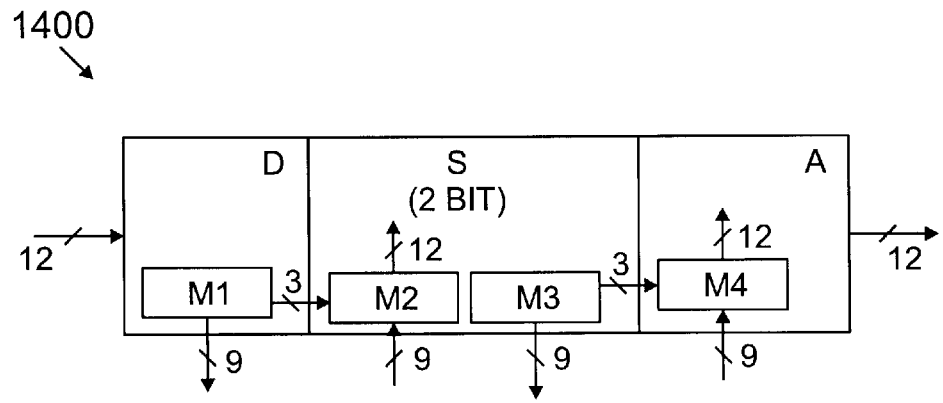
FIGS. 14A and 14B are, respectively, a functional level block diagram of a multi-bit switching module and a 576×576 switch employing four of such modules.
Figure 14B:
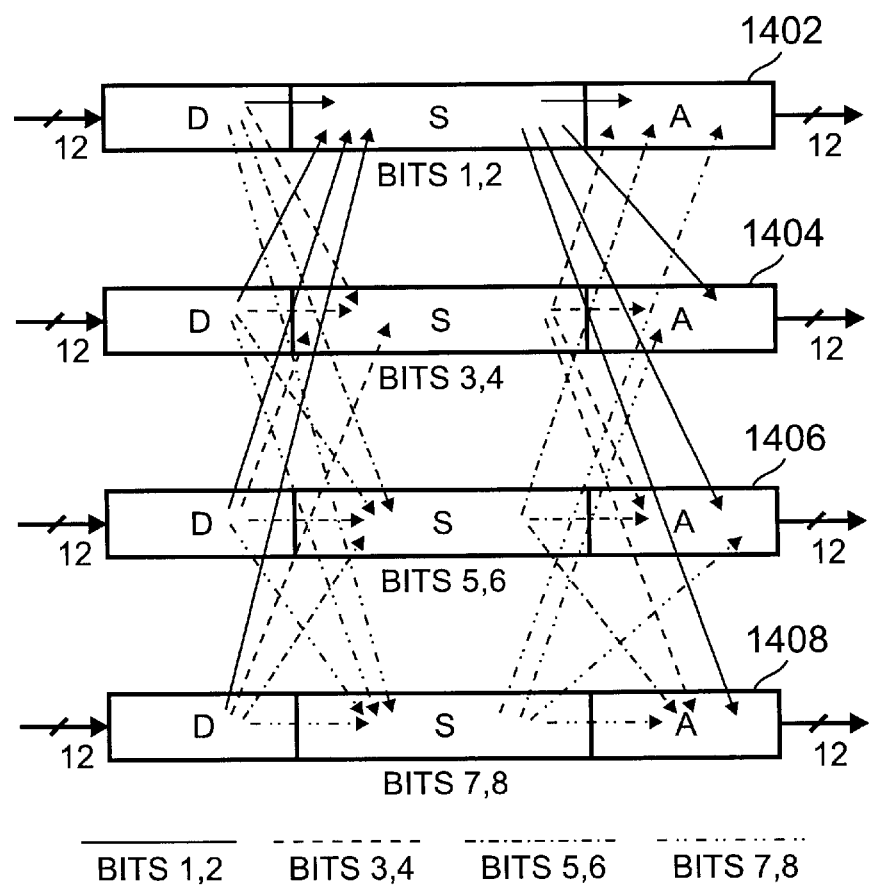

In previous illustrative embodiments, each disassembler output rail contains a single bit (e.g. bit 1 or bit 2, etc.) and, therefore, the number of output rails appeared to be limited to an integer multiple of eight. However, by multiplexing more than one bit onto an output rail, greater granularity and optimized device size may be obtained. An illustrative embodiment of a switch module 1400 of FIG. 14A may be combined with three other like switch modules, as illustrated in FIG. 14B, to produce a 576×576 STS-1 switch. The module 1400 includes 12 STS-12 inputs, so that each module provides connectivity for an equivalent of 12×12= 144 STS-1 signals. The module 1400 may be physically smaller than the module 1300 of FIG. 13A. Additionally, the module 1400 has only 12 outputs from the assembler A, compared to 16 outputs from the assembler A of module 1300.

A disassembler D produces 12 outputs, 3 of which are intra-device connections to the 2 bit switch block S. These three output rails contain bits 0 and 1 for all 144 STS-1 signals. Each rail carries both bits 0 and 1 for 48 STS-1 signals and thus has a periodicity of 96. If bit 1 follows bit 0 for each of the STS-1s, the switching of both bits can be accomplished with fewer transitions (and slightly lower power consumption) since the switch map information is identical for both the bits that belong to the same STS-1. However, any other multiplexing arrangements such as four bit 0s followed by four bit 1s can also be used as long as they are consistent with the switching core design. The 9 other disassembler outputs can be divided into three groups. Each group of three rails similarly carries 2 bits for 144 STS-1s. The corresponding interconnections for four switch modules 1402–1408 is illustrated in FIG. 14B. It should also be noted that the disassembler output rates need not be identical to the input rates. They can be at lower rates (e.g. at half the rate on twice as many rails) or higher rates to accommodate the capability of the interconnection technology.

In accordance with the principles of the present invention a wide variety of switches may be implemented using switch modules, each of which includes a disassembler, a switching core, and an assembler. All the component parts of all the modules employed by a particular switch implementation need not be used. For example, although eight modules may be used in a switch, not all the modules' disassemblers and assemblers need be used to implement the switch. Each switching core within each switch module is sized to cross-connect the total number of switchable entities (such as 768, 576, 1536, etc.) either for fractional/single/multiple bits. The total number of devices used in a switch is typically governed by the overall bits per data block(e.g. 8) divided by the bits per bit-pack (e.g. 2 bits, 1 bit or 0.5 bit, etc.) operated on by the switching core within each switch module. The total of the input (output) signals are distributed to (from) each switch module's disassembler (assembler). This distribution is typically an even distribution, when possible, in order to optimize the size and speed of a particular implementation. Disassembled outputs may be connected to a switching core through intra- or inter-module connections and switch outputs may be connected to assembler inputs through inter- or intra-module connections.

The foregoing description of specific embodiments of the invention has been presented for the purposes of illustration and description. It is not intended to be exhaustive or to limit the invention to the precise forms disclosed, and many modifications and variations are possible in light of the above teachings. For example, the physical implementation medium could take many forms, with each switch module produced as a board level product, a hybrid, an integrated circuit, or a cell or other similar sub-circuit within an integrated circuit. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A switch module for switching "Q" input data channels of digital input data to "R" output data channels, where Q and R are integers, said input data formatted as data blocks containing a fixed number of bits of data, each data block comprising "O" bit packs containing a number of bits "P", where O and P are integers, and the fixed number of bits of data in a data block is equal to P multiplied by O, said switch module comprising:
    a disassembler, for disassembling each data block into O bit packs, said disassembler configured to transmit away from a switching core PQO-PQ bits for every data block from the Q input data channels disassembled by said disassembler,
    said switching core, for respectively switching bit packs from Q input data channels to R output data channels, said switching core configured to switch PQ bits for every data block from the Q input data channels disassembled by the disassembler, where PQ indicates a multiplication of P times Q; and
    an assembler, for assembling O switched bit packs, into data blocks for R output data channels.

2. The switch module of claim 1, wherein the switching core is configured to switch PQO bits for every Q data blocks disassembled by the disassembler.

3. The switch module of claim 1, wherein the switching core is a space/time switching core.

4. The switch module of claim 3 wherein the switching core is a concentrator space/time switching core.

5. The switch module of claim 3 wherein the switching core is an expander space/time switching core.

6. The switch module of claim 1, wherein the disassembler, the switching core, and the assembler are implemented on a single integrated circuit.

7. The switch module of claim 1 wherein the total number of bits in a data block, PO=8.

8. The switch module of claim 1 wherein the disassembler is configured to disassemble data blocks into bit packs of less than one bit wherein the switching core is configured to operate on alternate bits.

9. A switch for switching data organized in data blocks composed of bit-packs from input channels into output channels, comprising:
    a plurality of switch modules, each including:
        a disassembler, wherein at least one disassembler of the plurality of switch modules is responsive to input data from one or more data channels by slicing the data blocks of all the data it receives from all the data channels into bit-packs;
        a switching core, said switching core responsive to a bit-pack received from a disassembler by switching the bit-pack from an input channel to an output channel; and
        an assembler, wherein at least one assembler of the plurality of switch modules is responsive to bit-packs received from one or more switching cores by assembling the bit-packs into data blocks for output channels,
        wherein the switch includes less than one switch module for each bit-pack within a date block.

10. The switch of claim 9 wherein the number of channels for which data is switched by the switch is an integer multiple of the number of modules wherein each module contains one switching core.

11. The switch of claim 9 wherein the switch is a non-blocking switch.

12. The switch of claim 9 wherein input and output data channels are evenly distributed to the modules.

13. The switch of claim 9 wherein at least one module is not connected to receive input data channels at its disassembler wherein the input data channels are routed through the switch using other disassemblers available in modules present.

14. The switch of claim 9 wherein each module is packaged In a separate integrated circuit.

15. The switch of claim 9 wherein a plurality of modules is packaged within a single integrated circuit.

16. The switch of claim 9 wherein the switching core within each module is a space/time switching core.

17. The switch of claim 16 wherein the switching core is an expander space/time switching core.

18. The switch of claim 9 wherein each disassembler is configured to disassemble data blocks greater than one byte wide.

19. The switch of claim 9 wherein the switch is configured to switch 768 STS-1 input channels to 768 STS-1 output channels.

20. The switch of claim 9 wherein a disassembler is configured to accept data from input channels on input rails, with each of the input rails receiving all the data blocks from an equal division of the input channels among the total number of input rails.

21. The switch of claim 20 wherein each disassembler is configured to output data on numbered output rails in the form of bit-packs, where each of the numbered output rails carries all the bit packs of all the input-channels.

* * * * *